United States Patent [19]
Pecori

[11] 4,016,486
[45] Apr. 5, 1977

[54] LAND MINE DETECTOR WITH PULSE SLOPE, WIDTH AND AMPLITUDE DETERMINATION CHANNELS

[75] Inventor: Peter M. Pecori, Alexandria, Va.

[73] Assignee: The United States of America as represented by the Secretary of the Army, Washington, D.C.

[22] Filed: Feb. 19, 1976

[21] Appl. No.: 659,453

[52] U.S. Cl. .................................... 324/3; 324/41
[51] Int. Cl.$^2$ ........................................ G01V 3/08
[58] Field of Search ............ 324/3, 41, 67, 71 CP, 324/6, 7; 340/258 B, 258 C

[56] References Cited
UNITED STATES PATENTS

| | | | |
|---|---|---|---|
| 2,012,479 | 8/1935 | Planta | 324/3 X |
| 2,744,232 | 5/1956 | Shawhan et al. | 324/3 |
| 2,768,347 | 10/1956 | Hansen | 324/3 X |
| 3,701,029 | 10/1972 | Hogg | 324/71 CP X |
| 3,790,883 | 2/1974 | Bergegere | 324/71 CP |
| 3,820,019 | 6/1974 | Doty et al. | 324/71 CP |
| 3,826,973 | 7/1974 | Pflaum | 324/3 |
| 3,835,371 | 9/1974 | Mirdadian et al. | 324/3 |
| 3,836,842 | 9/1974 | Zimmermann et al. | 324/3 X |

Primary Examiner—Gerard R. Strecker
Attorney, Agent, or Firm—Nathan Edelberg

[57] ABSTRACT

Circuitry for detecting buried non-metallic and metallic land mines is disclosed. A peak detector receives signals from a conventional search head. The output of the peak detector is amplified and this amplified signal is applied to a slope determination channel, to a pulse width determination channel and to a pulse amplitude determination channel. The output pulses from the slope determination channel, the pulse width determination channel and the pulse amplitude determination channel are all applied to different inputs of an AND gate. If pulses are coincidently present on all the inputs of the AND gate, the AND gate provides an output pulse which is applied to a field effect transistor (FET) switch. The FET switch controls the gain of an amplifier such that the gain of the amplifier is measurably increased when the AND gate applies a pulse to the FET switch. When the gain of the amplifier is increased by the FET switch, a signal burst indicating that a mine has been detected is produced on the output of the amplifier. The output from the amplifier is typically coupled to a headset worn by the person conducting the search.

10 Claims, 1 Drawing Figure

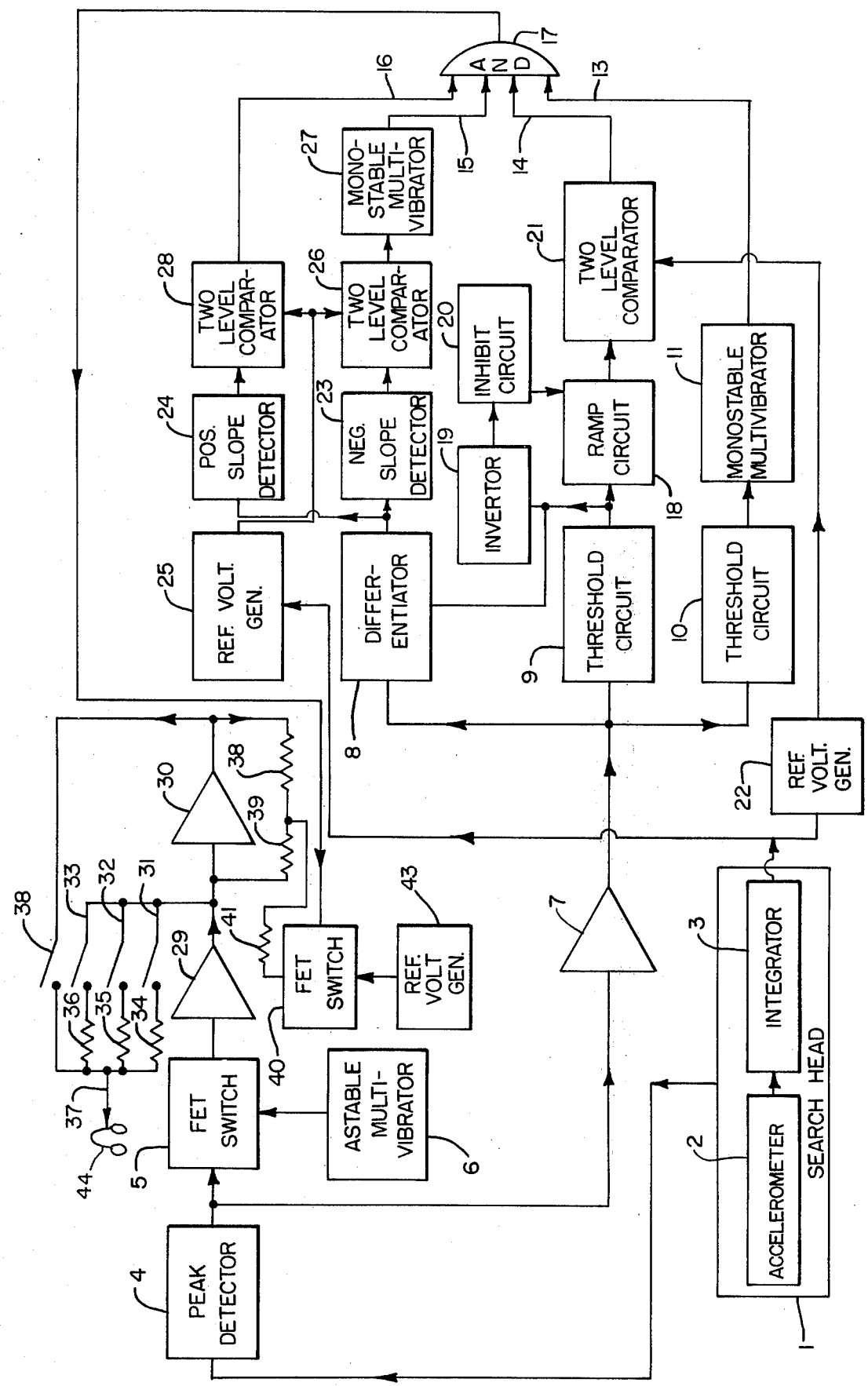

LAND MINE DETECTOR WITH PULSE SLOPE, WIDTH AND AMPLITUDE DETERMINATION CHANNELS

The invention described herein may be manufactured, used, and licensed by or for the Government for Governmental purposes without the payment to me of any royalties thereon.

BACKGROUND OF THE INVENTION

This invention relates to land mine detectors, and more particularly, to circuitry for enhancing the detection of non-metallic as well as metallic land mines.

The development and deployment of metallic land mines was followed by the development of detector systems for locating these buried metallic land mines. Most of these mine detector systems operated satisfactorily until non-metallic land mines were developed. Generally the prior art metallic land mine detectors either will not detect a buried non-metallic land mine or will not detect such a non-metallic land mine with a high degree of reliability. Thus, new detector systems capable of detecting both metallic and non-metallic land mines had to be developed. Several systems for detecting both metallic and non-metallic land mines have been developed and are presently being used. In one such prior art system that is presently being used, the signals from the search head are applied to processing circuitry in which the signals from the search head are chopped at a 1KHz rate, then amplified and low pass filtered to obtain a DC signal comparable to the signal from the search head. This DC signal is applied to an amplitude sensitive gate which controls the gain of a second amplifier. If the signals from the search head are of sufficient amplitude, the second amplifier provides an output signal indicating that a mine has been traversed by the search head.

While the prior art system detects the presence of buried non-metallic and metallic land mines, this system suffers from the fact that varous types of backgrounds can produce signals of sufficient amplitude to produce the same output produced by a land mine. This creates a situation where many signals other than true signals indicate the presence of a buried mine. The operation of this search system has no way of knowing if a given signal is a false or true signal; therefore neutralization steps must be taken eventhough no mine is present. This generation of false signals increases greatly the sweep time required to traverse a given area and causes loss of operator confidence.

This invention solves the problem of false signals by examining in addition to amplitude, the pulse width and slope of the signals from the search head. If a signal from the search head meets the slope, pulse width and amplitude requirements established by the circuitry of this invention, that signal qualifies as a mine signal and an output signal indicating the presence of a mine is produced. By examining these three parameters of the signals from a search head instead of just amplitude, this invention enhances mine signal detection while rejecting spurious signals.

SUMMARY OF THE INVENTION

This invention provides detection circuitry that detects non-metallic and metallic land mines. The circuitry of the invention examines the slope, pulse width and pulse amplitude of the signals received from a mine detector search head in three separate channels, a slope channel, a pulse width channel and a pulse amplitude channel. The output pulses from the three channels are applied to different inputs of an AND gate. If all the inputs of the AND gate receive a pulse at the same time, the AND produces an output pulse that is coupled to a field effect transistor (FET) switch. This FET switch controls the gain of an amplifier and if a pulse is received at the FET switch from the AND gate, the FET switch measurably increases the gain of the amplifier, thereby producing a signal burst output from the amplifier which indicates that a mine has been traversed by the search head. This signal burst is coupled to a headset worn by the person conducting the search.

The signals from the search head are compared to generated reference voltages in the pulse width channel and the slope channel. These reference voltages may be fixed voltages generated from the power supply of the system but are preferably variable reference voltages that vary with the speed at which the search head is moved over the surface of the soil because the waveform of the signals from the search head vary with search head speed. The variable reference voltages are obtained by the circuitry of this invention by means of an accelerometer and integrator that are incorporated into the search head. The output of the integrator is connected to the reference voltage generators to vary the output voltages of the generators in accordance with the speed of the search head.

The examination and processing of the slope, pulse width and pulse amplitude of the signals from the search head enhances the mine detection results while eliminating false signals. Therefore, the search time required to cover a given area is kept to a minimum and equipment operator confidence is maintained.

BRIEF DESCRIPTION OF THE DRAWING

A complete understanding of the invention can be obtained from the following detailed description when read in conjunction with the annexed drawing in which the single FIGURE shows in block diagram form a preferred embodiment of the invention.

DETAILED DESCRIPTION OF THE INVENTION

The circuitry of this invention is primarily designed to detect non-metallic land mines but will also detect metallic land mines. When an area is to be checked for buried land mines, the search head 1 is moved over the surface of the ground being checked. Search head 1 is a conventional land mine search head having an accelerometer 2 and integrator 3 mounted thereon. As will be described later, accelerometer 2 and integrator 3 are added to conventional search head 1 to provide scanning speed information.

The output signals from search head 1 are coupled to the input of a peak detector 4. The output from peak detector 4 is applied to one of two inputs of a first field effect transistor (FET) switch 5. The second of the two inputs of FET switch 5 is connected to the output of the astable multivibrator 6. The output of peak detector 4 is also connected to the input of an amplifier 7.

The output of amplifier 7 is connected to the first of two inputs of the differentiator 8, to the input of a first threshold circuit 7, and to the input of a second threshold circuit 10. The output of threshold circuit 10 is connected to the input of the monostable multivibrator 11 and the output of monostable multivibrator 11 is connected to the input 13 of AND gate 17.

The output of threshold circuit 9 is connected to the first of two inputs of the ramp circuit 18, to the input of the invertor 19 and to the second of the two inputs of differentiator 8. The output of invertor 19 is connected to the input of the inhibiting circuit 20 and the output of inhibiting circuit 20 is connected to the second of the two inputs of ramp circuit 18. The output of ramp circuit 18 is connected to the first of two inputs of the two level comparator 21. The second of the two inputs of two level comparator 21 is connected to the output of the reference voltage generator 22. The output of two level comparator 21 is connected to the input 14 of AND gate 17.

The output of differentiator 8 is connected to the input of the negative slope detector 23 and to the input of the positive slope detector 24. The output of negative slope detector 23 is connected to the first of two inputs of the two level comparator 26. The second of the two inputs of two level comparator 26 is connected to the output of the reference voltage generator 25. The output of two level comparator 26 is connected to the input of the monostable multivibrator 27. The output of monostable multivibrator 27 is connected to the input 15 of AND gate 17.

The output of positive slope detector 24 is connected to the first of two inputs of the two level comparator 28. The second of the two inputs of two level comparator 28 is connected to the output of reference voltage generator 25. The output of two level comparator 28 is connected to the input 16 of AND gate 17. The input of reference voltage generator 22 and the input of reference voltage generator 25 are both connected to the output of integrator 3.

The output of FET switch 5 is connected to the input of the amplifier 29. The output amplifier 29 is connected to the input of amplifier 30 and to the switches 31, 32 and 33. When the switches 31, 32 and 33 are closed, the output of amplifier 29 is coupled to the output lead 37 through the resistors 34, 35 and 36 respectively. As will ecome apparent, switches 31, 32 and 33 are utilized only after a land mine has been detected.

The output of amplifier 30 is connected to the switch 38 which when closed connects the output of amplifier 30 to output lead 37. The output of amplifier 30 is also coupled back to the input of amplifier 30 through the series connected resistors 38 and 39. The output of the field effect transistor (FET) switch 40 is coupled to the common point of resistors 38 and 39 through the resistor 41. The first of the two inputs of FET switch 40 is connected to the output of the reference voltage generator 43 and the second of the two inputs of FET switch 40 is connected to the output of AND gate 17.

Search head 1 is typically a UHF balanced bridge detector which is unbalanced by passing the search head over a soil area which has a dielectric constant different from the background. Such a condition exists when passing over a mine. When the search head 1 passes over a mine, an output signal, which is essentially an inverted cosine riding on a negative DC level, appears on the output of the search head. This inverted cosine output signal is coupled to the input of peak detector 4. The output of peak detector 4 is amplified by amplifier 7 and the amplified signal is then applied to the input of differentiator 8, the input of threshold circuit 9 and the input of threshold circuit 10 to obtain slope information, pulse width information and pulse amplitude information, respectively. Thus differentiator 8 and its associated circuitry constitute a slope determining channel, threshold circuit 9 and its associated circuitry constitute a pulse width determining channel, and threshold circuit 10 and its associated circuitry constitute a pulse amplitude determining channel.

Considering just the slope determining channel, the amplified signal from amplifier 7 is applied to differentiator 8 which is enabled by threshold circuit 9. Differentiator 8 is enabled by threshold circuit 9 such that an output is provided from differentiator 8 at a particular point on the leading edge (negative slope) of the waveform and on the trailing edge (positive slope) of the waveform. An output is taken on both the leading and trailing edge to compensate for any waveform distortion. The output signal taken on the negative slope (leading edge) is inputted to the negative slope detector 23 and the output of negative slope detector 23 is applied to one input of two level comparator 26 which also receives an output from reference voltage generator 25 at its second input. The output signal taken on the positive slope (trailing edge) is applied to the input of positive slope detector 24 from differentiator 8. The output of positive slope detector 24 is applied to one input of two level comparator 28 which receives a reference voltage on its second input from reference voltage generator 25.

Two level comparator 26 and 28 each contain two operational amplifiers. These circuits which are well known are designed to provide an output if the signal input lies within two voltage values determined by reference voltage generator 25 and the reference voltage input circuits of the operational amplifiers. Thus, two level comparator 28 provides an output when the signal input from positive slope detector 24 falls within the two reference voltage levels and two level comparator 26 provides an output when the signal input from negative slope detector 23 falls within these voltage values. Any output from two level comparator 28 is applied to input 16 of AND gate 17 and the output from two level comparator 26 is coupled to input 15 of AND gate 17 but is delayed one period by monostable multivibrator 27 before it is applied to input 15, a period being defined as the period of the signal waveform search head 1, so that the input pulse on input 15 of AND gate 17 will be coincident with the input pulse an input 16 of AND gate 17.

The pulse width determining channel operates as follows: The amplified signal from amplifier 7 is applied to threshold circuit 9 which provides an output signal when the signal from search head 1 drops below a given level (the signal being an inverted cosine wave). An output from threshold circuit 9 enables ramp circuit 18 which then starts to generate a ramp voltage on its output. The ramp output from ramp circuit 18 is applied to one input (the signal input) of two level comparator 21. A reference voltage from reference voltage generator 22 is applied to the second input of two level comparator 21. Two level comparator 21 is structurally identical to two level comparators 26 and 28 previously described. Thus any output from ramp circuit 18 is compared with two reference voltages in two level comparator 21 and if the ramp output from ramp circuit 18 lies within these two reference voltages, an output pulse is provided from two level comparator 21. This output pulse from two level comparator 21 is applied to input 14 of AND gate 17. When the signal from amplifier 7 rises above the level at which threshold circuit 9 enabled ramp circuit 18, invertor 19 is enabled to provide an input signal to inhibit circuit 20. In response to the input from invertor 19 inhibit circuit 20 provides an output signal which is applied to ramp circuit 18. This signal from exhibit circuit 20 cuts off ramp circuit 18.

The pulse amplitude channel operates as follows: In response to the amplified signal from amplifier 7, threshold circuit 10 provides an output signal when the signal amplitude of the signal from amplifier reaches a given level. The output from threshold circuit 10 enables monostable multivibrator 11 which in effect stores the output from threshold circuit 10 for ⅔ of a period, a period being defined as above. At the end of this delay, an output pulse is generated by monostable multivibrator 11 and this output pulse is applied to input 13 of AND gate 17. The delay of the input to input 13 of AND gate 17 is provided to assure that this input is coincident with the input pulses to inputs 14, 15 and 16 of AND gate 17.

If input pulses are present in coincidence on all four of the inputs 13, 14, 15 and 16 of AND gate 17, an output pulse is present on the output of AND gate 17. This output pulse is applied to one input of FET switch 40. A reference voltage from reference voltage generator 43 is applied to the other input of FET switch 40.

In addition to being applied to the input of amplifier 7, the output of peak detector 4 is applied to FET switch 5 which is controlled by astable multivibrator 6. The output from FET switch is applied to the input of amplifier 29 and the output of amplifier 29 is applied to the input of amplifier 30 whose gain is controlled by the reference voltage from reference voltage generator 43 and FET switch 40. In the absence of an output pulse from AND gate 17, the output of amplifier 30 is a low level output. If switch 38 is closed this low level output is applied to output lead 37 which is typically connected to a headset worn by the person conducting the land mine search. If now a pulse is applied to FET switch 40 from AND gate 17, the gain of amplifier 30 is increased measurably thereby causing a burst of signal tone in the headset. This signal burst indicates that search head 1 has located a land mine.

After a land mine has been located, switches 31, 32 and 33 may be operated to define the outline of the land mine. Such circuitry for defining the outline of a land mine and the operation of the circuitry is known in the art and is provided with some of the prior art land mine detector systems.

The reference voltages provided by reference voltage generators 22 and 25 may be fixed voltages derived from the supply voltages. However, variable references voltages are preferable since the pulse width and slope of the waveform from search head 1 will vary with the speed at which the search head traverses a target. Variable reference voltages are provided by reference voltage generators 22 and 25 under the control of accelerometer 2 and integrator 3 which are mounted on search head 1. Accelerometer 2 provides an output indicative of the speed at which search head 1 is being moved over the surface of the soil. The output from accelerometer 2 is integrated by integrator 3 and the integrated output from integrator 3 is used to control the output voltage of reference voltage generator 22 and the output voltage of reference voltage generator 25. When the output of integrator 3 changes, the reference voltages from reference voltage generators 22 and 25 change accordingly. In this manner, the reference voltages are varied to adjust for variations in the output waveform from search head 1 caused by variations in the speed at which search head 1 is moved over a target.

And the circuit elements of the invention are shown in block diagram form in the drawing. All these circuit elements are well known circuits available on the market and it is the manner in which these elements are interconnected and utilized that constitutes the invention.

While the invention has been discussed with reference to a specific embodiment, it will be obvious to those skilled in the art that various changes and modifications can be made to this specific embodiment without departing from the spirit and scope of the invention as set forth in the claims.

I claim:
1. A land mine detector comprising:
a search head;
a peak detector having an input coupled to said search head for receiving signals from said search head and having an output;
a first field effect transistor switch having a first input coupled to said output of said peak detector and having a second input and an output;
an astable multivibrator having an output coupled to said second input of said first field effect transistor switch;
a first amplifier having an input coupled to said ouput of said first field effect transistor switch and having an output;
a second amplifier having an input coupled to said output of said first amplifier and having an output coupled to a means for converting said second amplifier output into a user perceivable form;
means coupled to said second amplifier for controlling the gain of said second amplifier and thereby controlling the output as perceived by the user;
a third amplifier having an input coupled to said output of said peak detector;
an AND gate having first, second, third, and fourth inputs and having output coupled to said means to control the gain of said second amplifier;
slope determination means having an input coupled to said output of said third amplifier and having a first output coupled to said fourth input of said AND gate and a second output coupled to said third input of said AND gate;
pulse width determining means having an input coupled to said output of said third amplifier and an output coupled to said second input of said AND gate; and
pulse amplitude determining means having an input coupled to said output of said third amplifier and an output coupled to said first input of said AND gate.

2. A land mine detector as defined in claim 1 wherein said pulse amplitude determining means comprises:
a first threshold circuit having an input coupled to said output of said third amplifier and having an output; and a first monostable multivibrator having an input coupled to said output of said first threshold circuit and having an output coupled to said first input of said AND gate.

3. A land mine detector as defined in claim 2 wherein said pulse width determining means comprises:

a second threshold circuit having an input coupled to said output of said third amplifier and having an output;

a ramp circuit having a first input coupled to said output of said second threshold circuit and having a second input and an output;

a first reference voltage generator;

a first two level comparator having a first input coupled to said output of said ramp circuit, a second input coupled to said first reference voltage generator and an output coupled to said second input of said AND gate;

an invertor having an input coupled to said output of said second threshold circuit and having an output; and an inhibit circuit having an input coupled to said output of said second threshold circuit and an output coupled to said second input of said ramp circuit.

4. A mine detector as defined in claim 3 wherein said slope determination means comprises:

a differentiator having a first input coupled to said output of said third amplifier, a second input coupled to said output of said second threshold circuit and having an output;

a negative slope detector having an input coupled to said output of said differentiation and having an output;

a second reference voltage generator;

a second two level comparator having a first input coupled to said output of said negative slope detector, a second input coupled to said second reference voltage generator and having an output;

a second monostable multivibrator having an input coupled to said output of said second two level comparator and an output coupled to said third input of said AND gate;

a positive slope detector having an input coupled to said output of said differentiator and having an output; and a third two level comparator having a first input coupled to said output of said positive slope detector, a second input coupled to said second reference voltage generator and an output coupled to said fourth input of said AND gate.

5. A land mine detector as defined in claim 4 wherein said means to control the gain of said second amplifier comprises:

a third reference voltage generator;

a second field effect transistor switch having a first input coupled to said output of said AND gate, a second input coupled to said third reference voltage generator and an output coupled to said second amplifier.

6. A mine detector as defined in claim 5 wherein a first resistor and a second resistor are connected in series between said input and said output of said second amplifier and said output of said second field effect transistor switch is coupled to the common point of said first and second series connected resistors through a third resistor.

7. A mine detector as defined in claim 6 wherein said first and second reference voltage generators both provide fixed reference voltages.

8. A mine detector as defined in claim 6 wherein means for varying the reference voltage generated by said first reference voltage generator and for varying the reference voltage generated by said second reference voltage generator is coupled to both said first and said second reference voltage generators.

9. A mine detector as defined in claim 8 wherein said means for varying said voltage generated by said first reference voltage generator and for varying said voltage generated by said second reference voltage comprises an accelerometer and an integrator connected between said accelerometer and said first and said second reference voltage generators, the output of said integrator varying with changes in the scanning speed of said search head.

10. A mine detector as defined in claim 6 wherein said output of said first amplifier is coupled to means for defining the outline of detected land mine.

* * * * *